(12) United States Patent
Lee

(10) Patent No.: US 9,851,858 B2
(45) Date of Patent: Dec. 26, 2017

(54) TOUCH WINDOW AND TOUCH DEVICE

(71) Applicant: LG INNOTEK CO., LTD., Seoul (KR)

(72) Inventor: Gyu Rin Lee, Seoul (KR)

(73) Assignee: LG INNOTEK CO., LTD, Seoul (KR)

( * ) Notice: Subject to any disclaimer, the term of this patent is extended or adjusted under 35 U.S.C. 154(b) by 66 days.

(21) Appl. No.: 14/994,896

(22) Filed: Jan. 13, 2016

(65) Prior Publication Data
US 2016/0209960 A1  Jul. 21, 2016

(30) Foreign Application Priority Data

Jan. 16, 2015  (KR) ........................ 10-2015-0007739

(51) Int. Cl.
*G06F 3/044* (2006.01)
*G06F 3/047* (2006.01)

(52) U.S. Cl.
CPC .............. *G06F 3/044* (2013.01); *G06F 3/047* (2013.01); *G06F 2203/04103* (2013.01); *G06F 2203/04112* (2013.01)

(58) Field of Classification Search
CPC ........... G06F 2203/04103; G06F 3/044; G06F 3/0412; G06F 3/047; G06F 2203/04112
See application file for complete search history.

(56) References Cited

U.S. PATENT DOCUMENTS

| | | | |
|---|---|---|---|
| 2003/0151712 A1* | 8/2003 | Inoue | G02F 1/133371 349/139 |
| 2011/0157058 A1* | 6/2011 | Bita | G02B 6/0055 345/173 |
| 2014/0145282 A1* | 5/2014 | Shen | H01L 27/1462 257/432 |
| 2015/0070312 A1* | 3/2015 | Her | G06F 3/041 345/174 |
| 2015/0109246 A1* | 4/2015 | Lee | G06F 3/045 345/174 |
| 2015/0253810 A1* | 9/2015 | Shin | G06F 1/16 345/174 |
| 2015/0293634 A1* | 10/2015 | Her | G06F 3/044 345/174 |
| 2015/0373839 A1* | 12/2015 | Kim | H05K 1/0274 345/174 |

FOREIGN PATENT DOCUMENTS

KR  20-2006-0007561 A  8/2006

* cited by examiner

*Primary Examiner* — Dmitriy Bolotin
(74) *Attorney, Agent, or Firm* — KED & Associates, LLP

(57) ABSTRACT

A touch window includes a cover substrate, a reflective layer provided on the cover substrate and including a sensing electrode, a wire electrode connected with the sensing electrode, and a printed circuit board electrically connected with the sensing electrode through the wire electrode.

18 Claims, 13 Drawing Sheets

B    B'

TOUCH WINDOW AND TOUCH DEVICE

CROSS-REFERENCE TO RELATED APPLICATION

The present application claims priority under 35 U.S.C. §119 to Korean Patent Application No. 10-2015-0007739 filed on Jan. 16, 2015, whose entire disclosure is incorporated herein by reference.

BACKGROUND

1. Field

Embodiments relate to a touch window and a touch device.

2. Background

A touch window, which performs an input function through a touch of an image displayed on a display by an input device such as a stylus pen or a finger, has been applied to various electronic appliances.

The touch window may be classified, for example, as a resistive touch window or a capacitive touch window. In the resistive touch window, glass is shorted with an electrode due to pressure applied to an input device to detect position. In the capacitive touch window, a position of a touch point is detected by detecting a variation of capacitance between electrodes when a user touches the capacitive touch window.

In resistive touch windows, performance may be degraded through repeated use and scratches may occur. Accordingly, interest in capacitive touch windows having excellent endurance and a long lifespan has increased. Trials to introduce a touch interface into various objects as well as terminals, such as, e.g., a smart phone, have been increased. For example, trials not only to introduce a touch interface into objects such as home appliances but also to introduce the touch interface into household objects such as furniture have been made.

Therefore, there is a need for a novel-structured touch window applicable to various objects.

BRIEF DESCRIPTION OF THE DRAWINGS

The embodiments will be described in detail with reference to the following drawings in which like reference numerals refer to like elements wherein.

DETAILED DESCRIPTION

Figure 1:
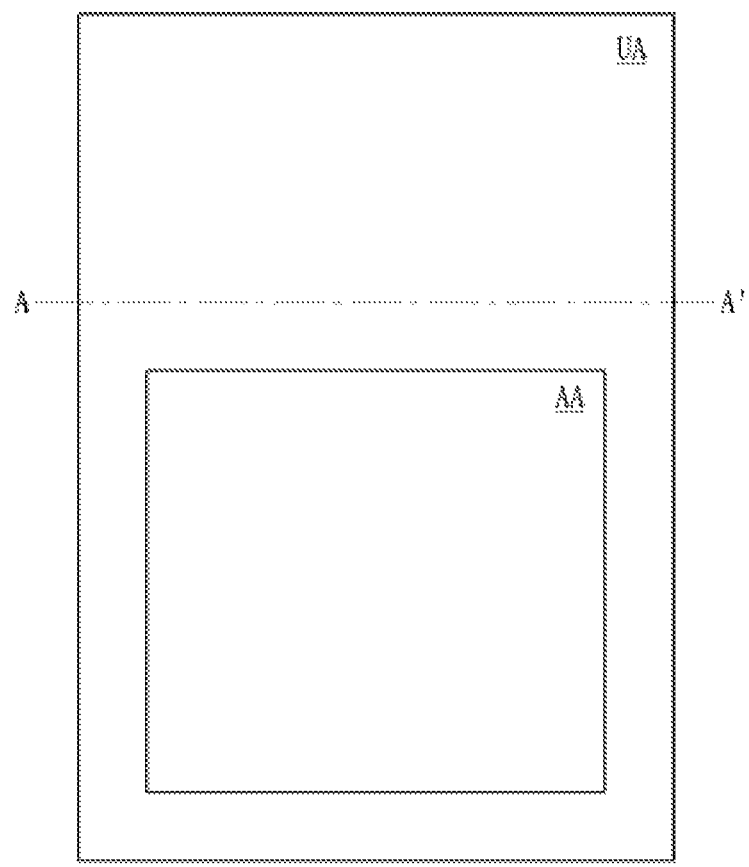
FIG. 1 is a plan view of a touch window according to an embodiment.
Figure 2:
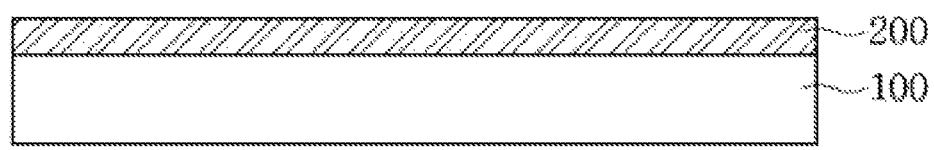
FIG. 2 is a sectional view taken along line A-A' of FIG. 1.

FIG. 1 is a plan of a touch window according to an embodiment. FIG. 2 is a sectional view taken along line A-A' of FIG. 1. Referring to FIGS. 1 and 2, a touch window according to the embodiment may include a cover substrate 100 and a reflective layer 200. In addition, the cover substrate 100 may have an active area AA and an unactive area UA defined therein.

Referring to FIG. 1, a portion of the cover substrate 100 may be defined as the active area AA, and an area surrounding the active area AA may be defined as the unactive area UA. For example, the unactive area UA of the cover substrate 100 may include a mirror, and the active area AA may include a mirror touch screen. In addition, differently from FIG. 1, an entire surface of the touch window may be defined as the active area AA.

An image may be displayed in the active area AA, and the image may not be displayed in the unactive area UA surrounding the active area AA. In addition, the active area AA may sense a position of a touch by an input device or a finger, and the unactive area UA may not sense the position of the touch by the input device or the finger.

As shown in FIG. 2, the touch window may include a reflective layer 200 provided on the cover substrate 100. The reflective layer 200 may be provided on one surface of the cover substrate 100. For example, the reflective layer 200 may directly make contact with one surface of the cover substrate. The reflective layer 200 may be provided corresponding to the entire portion of the one surface of the cover substrate 100. The reflective layer 200 may be provided at both the active area AA and the unactive area UA of the cover substrate 100.

The reflective layer 200 may reflect light. The reflective layer 200 may reflect light incident onto an opposite surface of the cover substrate 100 opposite to one surface of the cover substrate 100 provided therein with the reflective layer 200. Accordingly, a user who sees the opposite surface of the touch window may observe an outer appearance of the user reflected from the reflective layer 200. That is, the touch window may serve as a mirror through the reflective layer 200.

In addition, the reflective layer 200 may transmit light. The reflective layer 200 may transmit light from one side.

The reflective layer 200 may transmit light incident onto the opposite surface to one surface on which the cover substrate 100. Therefore, when a display device is provided on an opposite side of the cover substrate 100, a user may observe an image displayed on the display device. That is, the reflective layer 200 may reflect light incident onto one side thereof similarly to a mirror, and may transmit light incident onto an opposite side opposite to the one side. Accordingly, the touch window may be used in the form of one-way mirror due to the reflective layer 200.

The reflective layer 200 may have a conductive characteristic. For example, the reflective layer 200 may include a metallic layer to have conductivity. The reflective layer 200 may be a metallic thin film. The reflective layer 200 may include at least one metal selected from the group consisting chromium (Cr), nickel (Ni), copper (Cu), aluminum (Al), silver (Ag), molybdenum (Mo), gold (Au), titanium (Ti), and the alloy thereof.

In order to recognize the touch, the touch window may include a sensing electrode to measure resistance and/or capacitance varied by the touch by the input device or the finger. The reflective layer 200 of the touch window may include the sensing electrode. A partial area of the reflective layer 200 having conductivity may be patterned, and this patterned or pattern area may serve as a sensing electrode. For example, the pattern area may be electrically insulated from the entire portion of the reflective layer 200 through laser etching, and the pattern area, which may be electrically insulated from the reflective layer 200, may serve as a sensing electrode.

The touch window according to the embodiment may sense the touch by the input device without an additional touch panel by using the pattern area included in the reflective layer 200 as the sensing electrode.

Figure 3:
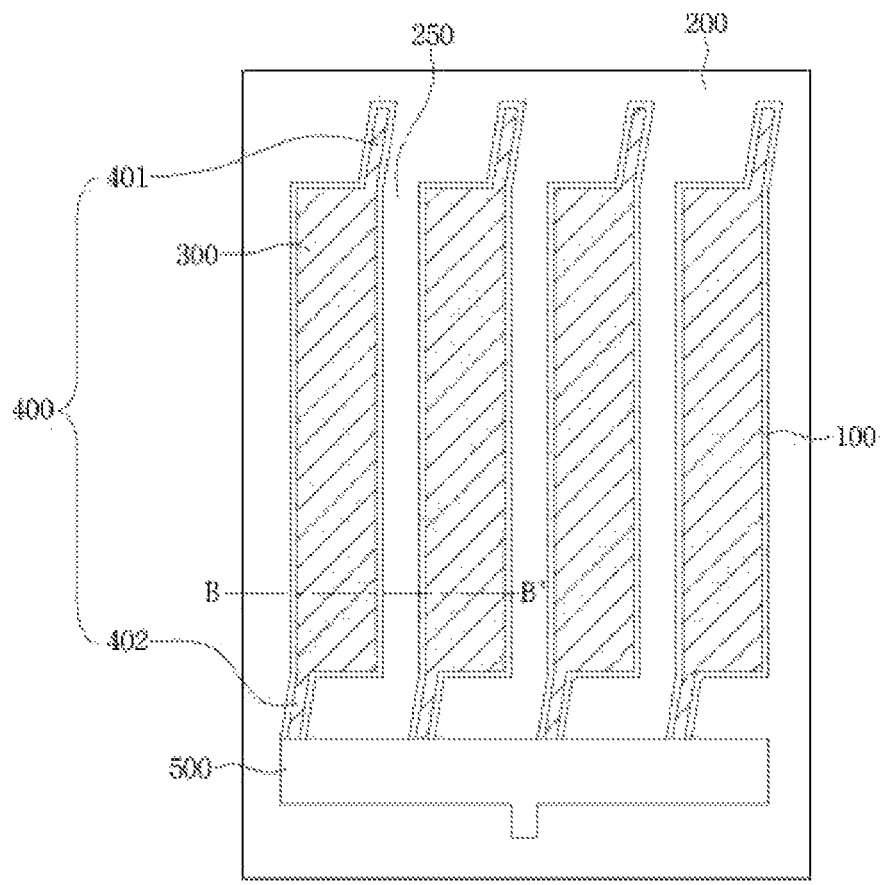
FIG. 3 is a plan view of an active area of the touch window according to the embodiment.
Figure 4:
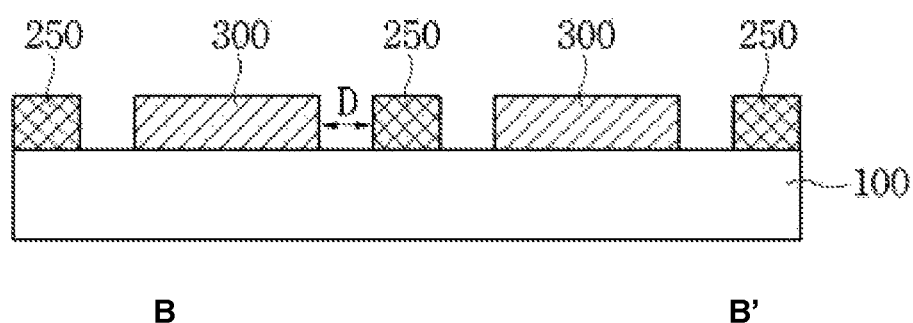
FIG. 4 is a sectional view taken along line B-B' of FIG. 3.

FIG. 3 is a plan view of the active area AA of the touch window according to the embodiment. FIG. 4 is a sectional view taken along line B-B' of FIG. 3. Referring to FIGS. 3 and 4, the touch window may include the cover substrate 100, the reflective layer 200, and a printed circuit board 500. In addition, the reflective layer 200 of the touch window may include the sensing electrode 300. The reflective layer 200 of the touch window according to the embodiment may further include a wire electrode 400.

The cover substrate 100 may be rigid, flexible, or stretchable. The cover substrate 100 may be rigid while being bent with a partial curved surface. That is, the cover substrate 100 may be a curved substrate or a bended substrate. For example, the cover substrate 100 may be bent with a partial flat surface and a partial curved surface. At least one end of the substrate 100 may be bent with a curved surface or may be bent or flexed with a surface including a random curvature.

Further, the touch window including the cover substrate 100 may have a flexible, curved, or bended characteristic. Accordingly, the touch window according to the embodiment may be easily carried by a user, and may be modified in various designs.

The sensing electrode 300 may be provided on the cover substrate 100. In other words, the cover substrate 100 may be a support substrate.

The reflective layer 200 may be provided on the cover substrate 100. The reflective layer 200 may reflect light incident onto one side similarly to a mirror, and transmit incident light onto an opposite side. Accordingly, the touch window may be used as one-way mirror due to the reflective layer 200.

The reflective layer 200 may have a conductive characteristic. Accordingly, the sensing electrode 300 may be formed in the reflective layer 200. A patterned or pattern area, which may be electrically insulated from another area, may be formed by etching the reflective layer 200 so that the pattern area may be used as the sensing electrode 300.

As shown in FIG. 4, the reflective layer 200 may include a remaining pattern 250 and the sensing electrode 300 electrically insulated from the remaining pattern 250. For electrical insulation, the remaining pattern 250 may be spaced apart from the sensing electrode 300 by an interval D. The remaining pattern 250 may refer to the reflective layer 200, which may not be patterned and adjacent to the sensing electrode 300. The remaining pattern 250 and the pattern of the sensing electrode 300 may be viewed through the interval D between the remaining pattern 250 and the sensing electrode 300.

In order to prevent the patterns from being viewed or visible, the interval D between the remaining pattern 250 and the sensing electrode 300 may be in the range of 0.1 μm to 500 μm. For example, the interval D between the remaining pattern 250 and the sensing electrode 300 may be in the range of 1 μm to 200 μm. The interval D between the remaining pattern 250 and the sensing electrode 300 may be in the range of 1 μm to 20 μm. When the interval D between the remaining pattern 250 and the sensing electrode 300 may be less than 0.1 μm, the sensing electrode 300 and the remaining pattern 250 may be shorted with each other, and a process of forming the interval D may be difficult. When the interval D between the remaining pattern 250 and the sensing electrode 300 exceeds 500 μm, the pattern of the sensing electrode 300 may be viewed or visible.

A dielectric substance may be filled in the space between the remaining pattern 250 and the sensing electrode 300. For example, air may be filled in the space between the remaining pattern 250 and the sensing electrode 300. The dielectric substance may include and adhesive layer (OCR or OCA).

In addition, an insulating blackening material may be filled in a portion or an entire portion of the space between the remaining pattern 250 and the sensing electrode 300. The insulating blackening material may absorb light reflected from the reflective layer 200 to prevent the pattern of the sensing electrode 300 from being viewed and to prevent the reflective layer 200 from being oxidized.

The sensing electrode 300 may include variously-shaped patterns of the sensing electrode 300. As shown in FIG. 3, a pattern of the sensing electrode 300 may include a plurality of bar patterns. The pattern of the sensing electrode 300 may have various shapes including a polygonal shape, such as a rectangular shape, a diamond shape, a polygonal shape, or a hexagonal shape, or a circular shape, or may have an irregular shape.

The touch window may further include the wire electrode 400 to electrically connect the sensing electrode 300 with the printed circuit board 500. The wire electrode 400 may be connected with one end and an opposite end of the sensing electrode 300. In addition, the wire electrode 400 extends to the printed circuit board 500 to electrically connect the sensing electrode 300 with the printed circuit board 500.

For example, the reflective layer 200 may include the wire electrode 400. That is, a partial area of the reflective layer 200 may be electrically insulated from a remaining area of the reflective layer 200 by patterning the reflective layer 200, and the partial area of the reflective layer 200, which may be electrically insulated from the remaining area of the reflective layer 200, may be used as the wire electrode 400.

The wire electrode 400 may be formed by patterning the reflective layer 200 so that the wire electrode 400 may be connected with the pattern area constituting the sensing electrode 300 while extending the printed circuit board 500. The mutually different remaining patterns 250 and the pattern area constituting the wire electrode 400 may be spaced apart from each other.

However, the remaining pattern 250 and/or the wire electrode 400 may be visible through the interval between the remaining pattern 250 and the wire electrode 400. In order to prevent the remaining pattern 250 and/or the wire electrode 400 from being visible, an interval between the remaining pattern 250 and the wire electrode 400 may be in the range of 0.1 µm to 500 µm. For example, the interval between the remaining pattern 250 and the wire electrode 400 may be in the range of 1 µm to 200 µm. The interval between the remaining pattern 250 and the wire electrode 400 may be in the range of 1 µm to 20 µm. When the interval between the remaining pattern 250 and the wire electrode 400 may be less than 0.1 µm, the wire electrode 400 and the remaining pattern 250 may be shorted with each other, and a process of forming the interval may be difficult. When the interval between the remaining pattern 250 and the wire electrode 400 exceeds 500 µm, the pattern of the wire electrode 400 may be viewed.

A dielectric substance may be filled in the space between the remaining pattern 250 and the wire electrode 400. For example, air may be filled in the space between the remaining pattern 250 and the wire electrode 400. The dielectric substance may include and adhesive layer (OCR or OCA).

In addition, an insulating blackening material may be filled in a portion or an entire portion of the space between the remaining pattern 250 and the wire electrode 400. The insulating blackening material may absorb the light reflected from the reflective layer 200 to prevent the pattern of the wire electrode 400 from being visible and to prevent the reflective layer 200 from being oxidized.

Further, an insulating layer may be provided on the reflective layer 200, and an additional wire electrode 400 may be provided on the insulating layer.

The printed circuit board 500 may be provided on the reflective layer 200 so that the printed circuit board 500 may be electrically connected with the wire electrode 400. The printed circuit board 500 may be provided on the reflective layer 200 by directly bonding the printed circuit board 500 to the patterned wire electrode 400. Accordingly, the touch window according to the embodiment may sense the touch without an additional touch panel so that a process cost may be reduced.

The printed circuit board 500, which may be configured to transmit a touch signal input into a driving part that processes the touch signal processed according to the touch input, may transmit an electrical signal received from the wire electrode 400 to the driving part, such as, for example, a driver IC. For example, the printed circuit board 500 may include a flexible printed circuit board (FPCB).

Accordingly, the touch window may be utilized as a mirror at one side (for example, a side facing a user), and at least a portion of the touch window (for example, the active area AA) may recognize the touch by the input device. As a capacitor is formed between the sensing electrodes 300, the touch window may sense the touch by measuring the variation in capacitance of the capacitor when the touch occurs by the input device. In addition, the touch window may sense the touch by measuring the degree of variation of the resistance and/or capacitance inside the sensing electrode 300 according to touches by the input device. That is, the touch window according to the embodiment may sense the position of the touch through self-capacitance or mutual-capacitance.

Figure 5:
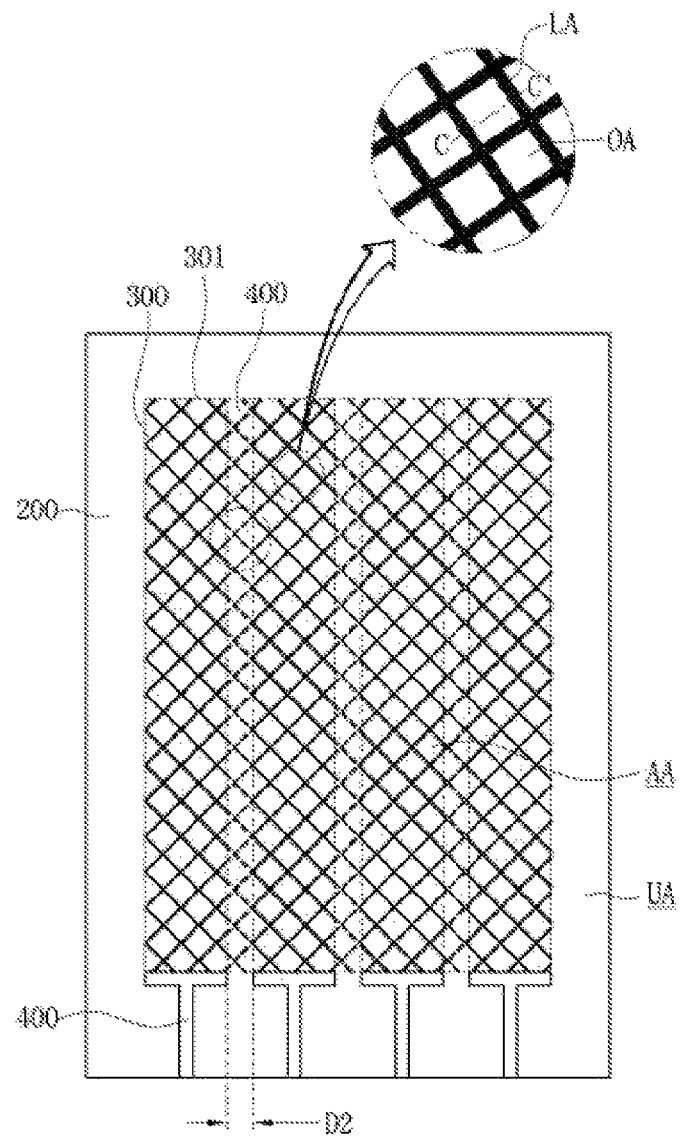
FIG. 5 is a plan view of an active area of a touch window according to another embodiment.
Figure 6:
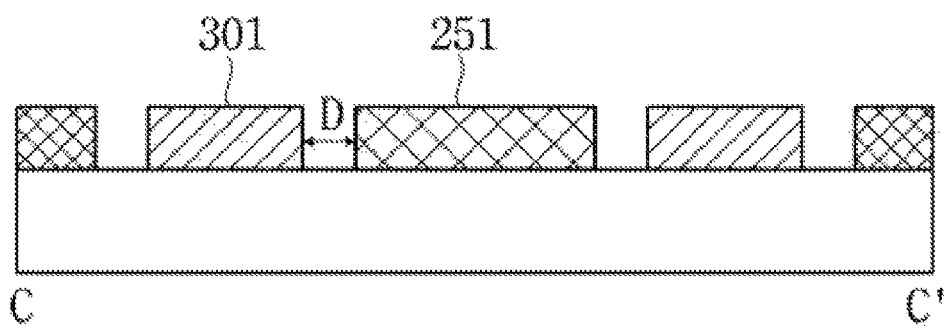
FIG. 6 is a sectional view taken along line C-C' of FIG. 5.
Figure 7:
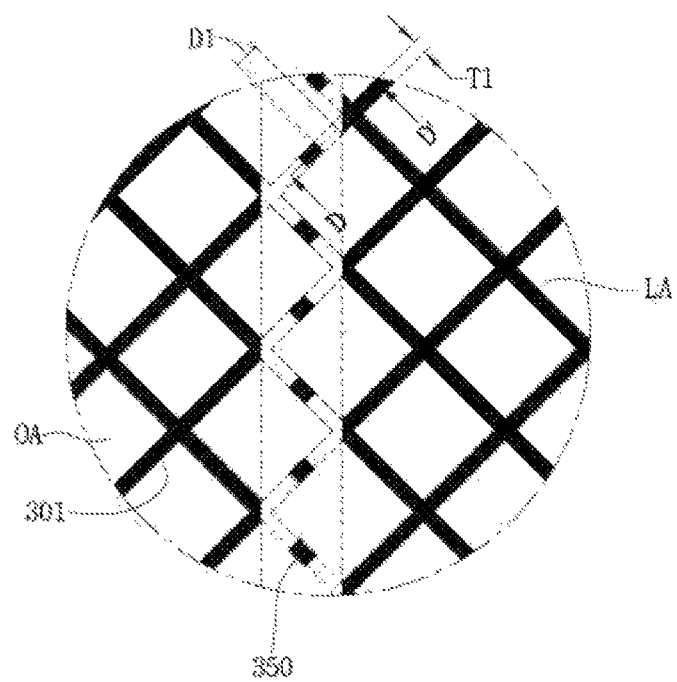
FIG. 7 is an enlarged view showing a part A of FIG. 5.
Figure 8:
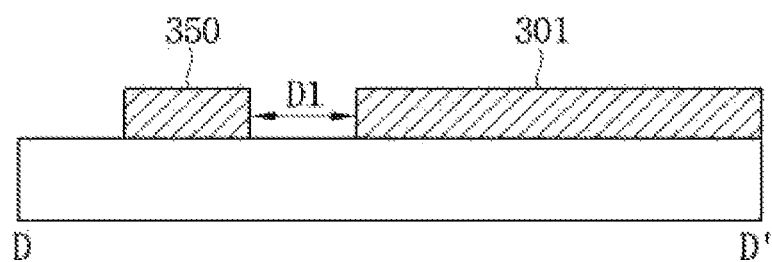
FIG. 8 is a sectional view taken along line D-D' of FIG. 7.

FIG. 5 is a plan view of an active area AA of a touch window according to another embodiment. FIG. 6 is a sectional view taken along line C-C' of FIG. 5. FIG. 7 is an enlarged view of a part A of FIG. 5. FIG. 8 is a sectional view taken along line D-D' of FIG. 7. In the following description, same reference numerals may be assigned to elements or components performing same or similar functions as those of the previous embodiment. In addition, the following description may be made focusing on differences from the previous embodiment.

Referring to FIGS. 5 to 8, the touch window according to another embodiment may include a cover substrate 100 and a reflective layer 200. The reflective layer 200 may include the sensing electrode 300. The reflective layer 200 may allow the cover substrate 100 to have the characteristic of one-way mirror, and may include a conductive material.

In addition, the sensing electrode 300 may be formed in the reflective layer 200 through patterning. That is, the reflective layer 200 may include the sensing electrode 300. In this case, the sensing electrode 300 may include a sub-electrode 301. That is, the sensing electrode 300 may include a plurality of sub-electrodes 301 crossing each other, and the sub-electrodes 301 may have a mesh shape, so that the sensing electrode 300 may be prevented from being viewed from the outside.

For example, the sub-electrode 301 may include a mesh line LA and a mesh opening OA formed between mesh lines LA due to the sub-electrodes 301 crossing each other in the mesh shape. The mesh line LA may have a line width in the range of about 0.1 µm to about 10 µm. When the mesh line LA has a line width less than 0.1 µm, it may be impossible to form the mesh line LA through manufacturing process or a short of the mesh line LA may occur. When the mesh line LA has a line width more than 10 µm, the electrode pattern may be viewed from the outside so that visibility may be deteriorated. The line width of the mesh line LA may be in the range of about 0.5 µm to about 7 µm. For example, the line width of the mesh line LA may be in the range of about 1 µm to about 3.5 µm.

The mesh opening OA may have various shapes. For example, the mesh opening OA may have various shapes such as a polygonal shape including a rectangular shape, a diamond shape, a pentagonal shape or a hexagonal shape, or a circular shape. In addition, the mesh opening OA may have a regular shape or a random shape.

Since the sensing electrode 300 has the mesh shape, it may be possible to hide the pattern of the sensing electrode 300 on the active area OA, for example, the display area. That is, even if the sensing electrode 300 is formed of metal, the pattern of the sensing electrode 300 may not be visible. In addition, even if the sensing electrode 300 is applied to a large-size touch panel, a resistance of the touch panel may be reduced.

The pattern of the sub-electrode 301 may be formed by patterning a partial area of the reflective layer 200 and electrically insulating the pattern of the sub-electrode 301 from a remaining area of the reflective layer 200. The reflective layer 200 may include a remaining pattern 251 and the pattern of the sub-electrode 301. The remaining pattern 251 may be spaced apart from the sub-electrode 301.

The remaining pattern 251 and the pattern of the sub-electrode 301 may be visible through the interval D between the remaining pattern 251 and the pattern of the sub-electrode 301. In order to prevent the patterns from being visible, the interval between the remaining pattern 251 and the sub-electrode 301 may be in the range of 0.1 µm to 500 µm. The interval D between the remaining pattern 251 and the sub-electrode 301 may be in the range of 1 µm to 200 µm. For example, the interval D between the remaining pattern 251 and the sub-electrode 301 may be in the range of 1 µm to 20 µm. When the interval D between the remaining pattern 251 and the sub-electrode 301 may be less than 0.1 µm, the sub-electrode 301 and the remaining pattern 251 may be shorted with each other, and a process of forming the interval D may be difficult. When the interval D between the remaining pattern 251 and the sub-electrode 301 exceeds 500 µm, the pattern of the sub-electrode 301 may be visible.

A dielectric substance may be filled in the space between the remaining pattern 251 and the sub-electrode 301. For example, air may be filled in the space between the remaining pattern 251 and the sub-electrode 301. In addition, the dielectric substance may include and adhesive layer (OCR or OCA).

In addition, an insulating blackening material may be filled in a portion or an entire portion of the space between the remaining pattern 251 and the sub-electrode 301. The insulating blackening material absorbs the light reflected from the reflective layer 200 to prevent the pattern of the sub-electrode 301 from being visible and to prevent the reflective layer 200 from being oxidized.

As shown in FIGS. 7 and 8, a dummy pattern 350 may be additionally interposed or provided between mutually adjacent sensing electrodes 300. The sensing electrodes 300 may be spaced apart from each other so that the sensing electrode 300 may be electrically insulated from each other. When the interval between the sensing electrodes 300 is increased, the sensing electrode 300 may be visible. Accordingly, the visibility of the touch window may be improved by interposing or providing the dummy pattern 350 of the reflective layer 200 between the sensing electrodes 300.

The dummy pattern 350 may be spaced apart from the sub-electrode 301 while forming the space between the remaining pattern 251 and the sub-electrode 301. However, the pattern of the sub-electrode 301 may be visible through the interval between the dummy pattern 350 and the sub-electrode 301. In order to prevent the pattern of the sub-electrode 301 from being visible, an interval between the dummy pattern 350 and the sub-electrode 301 may be in the range of 0.1 µm to 500 µm. The interval between the dummy pattern 350 and the sub-electrode 301 may be in the range of 1 µm to 200 µm. For example, the interval between the dummy pattern 350 and the sub-electrode 301 may be in the range of 1 µm to 20 µm.

A dielectric substance may be filled in the space between the dummy pattern 350 and the sub-electrode 301. For example, air may be filled in the space between the dummy pattern 350 and the sub-electrode 301. In addition, the dielectric substance may include and adhesive layer (OCR or OCA).

In addition, an insulating blackening material may be filled in a portion or an entire portion of the space between the dummy pattern 350 and the sub-electrode 301. The insulating blackening material absorbs the light reflected from the reflective layer 200 to prevent the pattern of the sub-electrode 301 from being visible and to prevent the reflective layer 200 from being oxidized.

The touch window may further include the wire electrode 400 to electrically connect the sub-electrode 301 with the printed circuit board 500. The wire electrode 400 may be connected with one end and an opposite end of the sub-electrode 301. The wire electrode 400 may extend to the printed circuit board 500 to electrically connect the sub-electrode 301 with the printed circuit board 500.

For example, the reflective layer 200 may include the wire electrode 400. That is, a partial area of the reflective layer 200 may be separated from a remaining area of the reflective layer 200 by patterning the reflective layer 200, and the partial area of the reflective layer 200, which may be separated from the remaining area of the reflective layer 200, may be used as the wire electrode 400. The insulating layer may be provided on the reflective layer 200, and an additional wire electrode 400 may be provided on the insulating layer.

Figure 9:
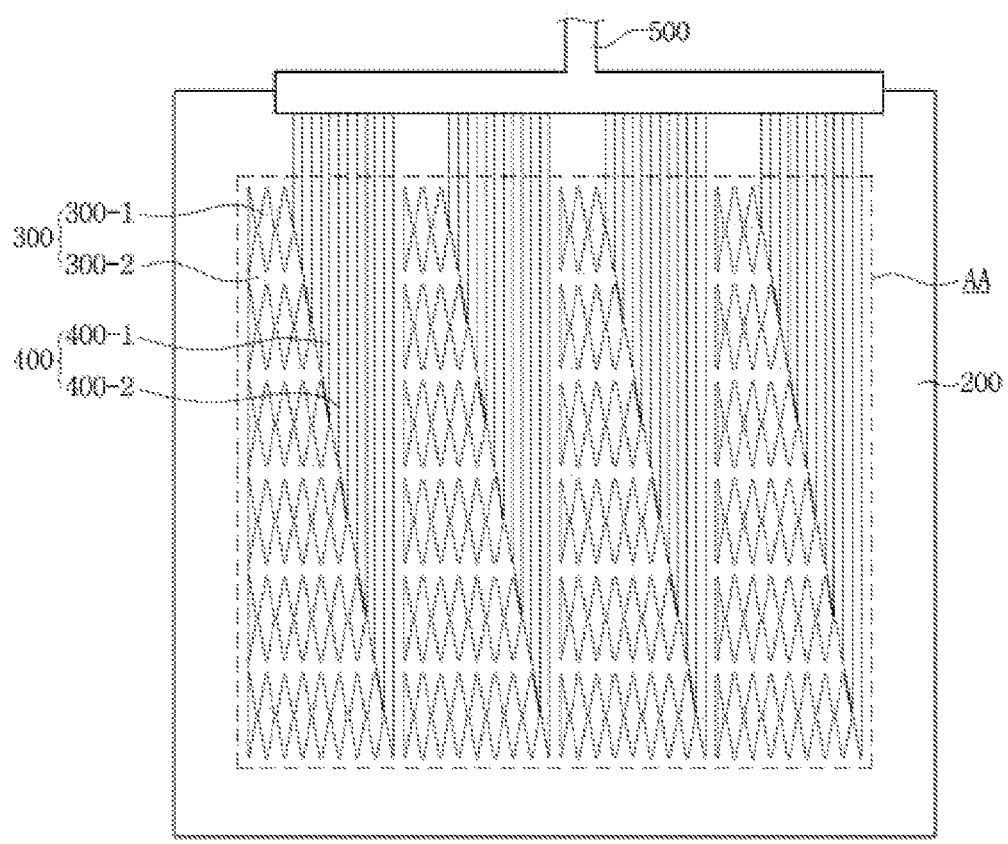
FIG. 9 is a plan view of an active area of a touch window according to another embodiment.
Figure 10:
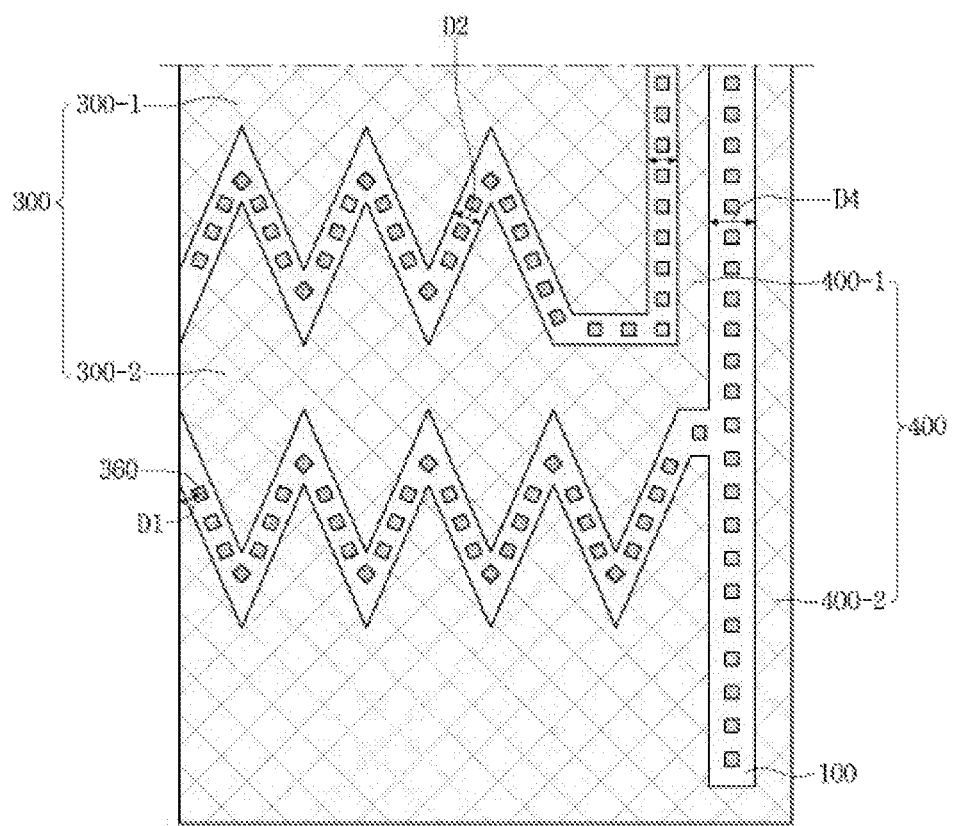
FIG. 10 is an enlarged view showing an area A having a sensing electrode and a wire electrode of FIG. 9.

FIG. 9 is a plan view of an active area of a touch window according to still another embodiment. FIG. 10 is an enlarged view of an area A having a sensing electrode and a wire electrode of FIG. 9. In the following description, same reference numerals may be assigned to elements or components performing same or similar functions as those of the previous embodiment. In addition, the following description may be made focusing on differences from the previous embodiment.

The touch window according to still another embodiment may include a cover substrate 100 and a reflective layer 200, and the reflective layer 200 may include a sensing electrode 300.

The touch window may detect the position of the touch by the input device through a self-capacitance scheme. For example, a reference signal may traverse the sensing electrode 300 through uniform resistance design in the sensing electrode 300. That is, the reference signal may traverse the sensing electrode 300 due to the uniform resistance. In addition, when a touch occurs, voltage variation may occur due to the variation in the capacitance between a touched object and the sensing electrode 300, and the voltage variation may be calculated as a function of time so that a position of the touch can be calculated. That is, a time difference between time responses resulting from voltage variation may be made. Accordingly, a modified signal may be compared with a reference signal to recognize the position of the touch.

The self-capacitance scheme may represent excellent sensitivity, and allow proximity sensing. However, based on the self-capacitance scheme, recognition of a multi-touch may be difficult. In order to overcome this limitation in recognition of the multi-touch, a plurality of sensing electrodes 300 may be formed in the reflective layer 200 to sense multiple touches according to still another embodiment.

For example, the sensing electrode 300 may include a plurality of electrode patterns 300-1 and 300-2. The sensing electrode 300 may include a plurality of electrode patterns 300-1 and 300-2 arranged in the form of a matrix.

In addition, the wire electrode 400 may be connected with each of the electrode patterns 300-1 and 300-2. Accordingly, the sensing electrode 300 may sense the position of the touch due to variation in the capacitance between the touched object and the electrode patterns 300-1 and 300-2 when the sensing electrode 300 is touched. In addition, since the wire electrode 400 recognizes capacitance varied at each of the the electrode patterns 300-1 and 300-2, multiple touches may be detected.

For example, the sensing electrode 300 may include the first electrode pattern 300-1 and the second electrode pattern 300-2. In addition, the first and second electrode patterns 300-1 and 300-2 may be spaced apart from each other on the same plane of the cover substrate 100 so that the first and second electrode patterns 300-1 and 300-2 may not make contact with each other.

The first and second electrode patterns 300-1 and 300-2 may be vertically and alternately arranged. At least two columns, in which the first electrode pattern 300-1 and the second electrode pattern 300-2 may be alternately arranged, may be horizontally arranged at a predetermined interval.

The electrode patterns 300-1 and 300-2 may have a regular shape, such as a rectangular shape or a pentagonal shape, or a random shape. When the pattern of the sensing electrode 300 has the rectangular shape, and a touch occurs between mutually adjacent sensing electrodes 300, the position of the touch may not be exactly recognized.

Therefore, as shown in FIG. 10, the first and second electrode patterns 300-1 and 300-2 may include branch electrodes. A branch electrode of the first electrode pattern 300-1 may be offset from a branch electrode of the second electrode pattern 300-2. Therefore, even if the touch occurs between the first and second electrode patterns 300-1 and 300-2, the touch may be exactly sensed so that sensitivity of the touch may be improved.

The first and second electrode patterns 300-1 and 300-2 may have various shapes sufficient to space the first and second electrode patterns 300-1 and 300-2 apart from each other, but the embodiment is not limited thereto.

In addition, each of the electrode patterns 300-1 and 300-2 may be connected with the wire electrode 400. That is, the first electrode patterns 300-1 may be connected with a plurality of first wire patterns 400-1, respectively. Further, the second electrode patterns 300-2 may be connected with a plurality of second wire patterns 400-2. Therefore, the sensing electrode 300 may sense multiple touches based on capacitance variation between the input device and the electrode patterns 300-1 and 300-2 when the multiple touches occur.

As shown in FIG. 10, the adjacent electrode patterns 300-1 and 300-2 may be arranged with the space therebetween. In this case, the remaining pattern may not be arranged between the adjacent electrode patterns 300-1 and 300-2.

The electrode pattern may be visible through the interval D2 between the electrode patterns 300-1 and 300-2. In order to prevent the patterns from being visible, the interval D2 between adjacent electrode patterns 300-1 and 300-2 may be in the range of 0.1 μm to 500 μm. The interval D2 between adjacent electrode patterns 300-1 and 300-2 may be in the range of 1 μm to 200 μm. For example, the interval D2 between the electrode patterns 300-1 and 300-2 may be in the range of 1 μm to 20 μm. When the interval D2 between the electrode patterns 300-1 and 300-2 may be less than 0.1 μm, the sensing electrode 300 and the remaining pattern 251 may be shorted with each other, and a process of forming the interval may be difficult. When the interval D2 between the adjacent electrode patterns 300-1 and 300-2 exceeds 500 μm, the electrode patterns 300-1 and 300-2 may be visible.

The dummy pattern 350 may be further interposed or provided between the electrode patterns 300-1 and 300-2, but the embodiment is not limited thereto. The dummy pattern 350 may be interposed or provided between the first electrode pattern 300-1 and the second electrode pattern 300-2. The dummy pattern 350 may be formed by patterning the reflective layer 200. Accordingly, an optical characteristic and visibility of the touch window may be improved through the dummy pattern 350. As the visibility is improved due to the arrangement of the dummy pattern 350, the interval D2 between the electrode patterns 300-1 and 300-2 may be increased. Accordingly, the short between the electrode patterns 300-1 and 300-2 may be prevented.

A dielectric substance may be filled in the space between the electrode patterns 300-1 and 300-2. For example, air may be filled in the space between the electrode patterns 300-1 and 300-2. In addition, the dielectric substance may include and adhesive layer (OCR or OCA).

In addition, an insulating blackening material may be filled in a portion or an entire portion of the space between the electrode patterns 300-1 and 300-2. The insulating blackening material may absorb the light reflected from the reflective layer 200 to prevent the pattern of the sensing electrode 300 from being visible and to prevent the reflective layer 200 from being oxidized.

The wire electrodes may be connected with the electrode patterns 300-1 and 300-2, respectively. The wire electrode 400 may be connected with one end and an opposite end of the sensing electrode 300. In addition, the wire electrode 400 may extend to the printed circuit board 500 to electrically connect the sensing electrode 300 with the printed circuit board 500.

The reflective layer 200 may include the wire electrode 400. In other words, a partial area or portion of the reflective layer 200 may be separated from a remaining area of the reflective layer 200 by patterning the reflective layer 200, and the portion of the reflective layer 200, which may be separated from the reflective layer 200, may be used as the wire electrode 400. The wire electrode 400 may be formed by patterning the reflective layer 200 so that the wire electrode 400 may be connected with the pattern area constituting the sensing electrode 300 while extending the printed circuit board 500.

The wire electrode 400 may be spaced apart from the electrode patterns 300-1 and 300-2 or the remaining pattern 251 of the reflective layer 200 by a predetermined interval. The wire electrodes 400 may be spaced apart from each other by an interval D4. The wire electrode 400 and the electrode patterns 300-1 and 300-2 may be visible through the interval D4 between the wire electrode 400 and the electrode patterns 300-1 and 300-2, or the interval D4 between mutually adjacent wire electrodes 400. In order to prevent the wire electrode 400 and the electrode patterns 300-1 and 300-2 from being visible, the interval D4 between the wire electrode 400 and the electrode patterns 300-1 and 300-2, or the interval D4 between the wire electrodes 400 may be in the range of 0.1 μm to 500 μm. The interval D4 between the wire electrode 400 and the electrode patterns 300-1 and 300-2, or the interval D4 between the wire electrodes 400 may be in the range of 1 μm to 200 μm. For example, the interval D4 between the wire electrode 400 and the electrode patterns 300-1 and 300-2, or the interval D4 between the wire electrodes 400 may be in the range of 1 μm to 20 μm.

The dielectric substance may be filled in the space of the interval D4. In addition, the dielectric substrate may be an adhesive layer (OCR or OCA). For example, the air or the insulating blackening material may be filled in the space of the distance. Further, an insulating layer may be provided on the reflective layer 200, and an additional wire electrode 400 may be provided on the insulating layer.

Figure 11:
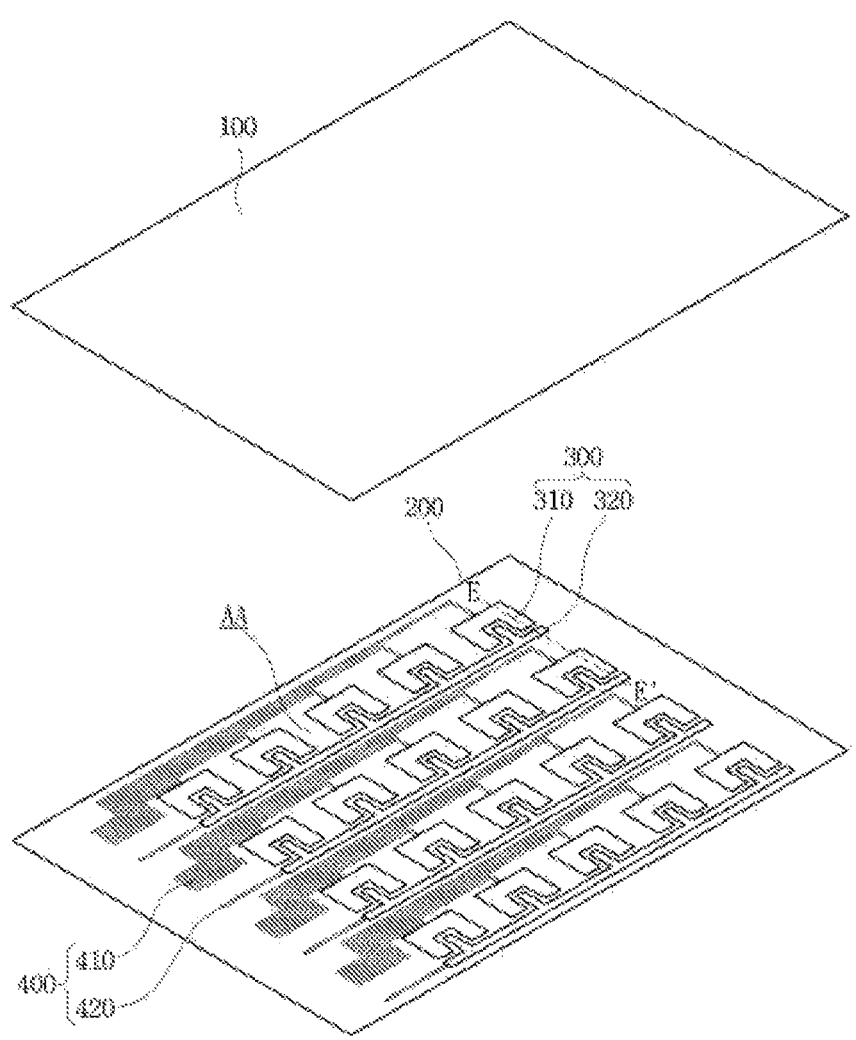
FIG. 11 is a perspective view of an active area of a touch window according to still another embodiment.
Figure 12:
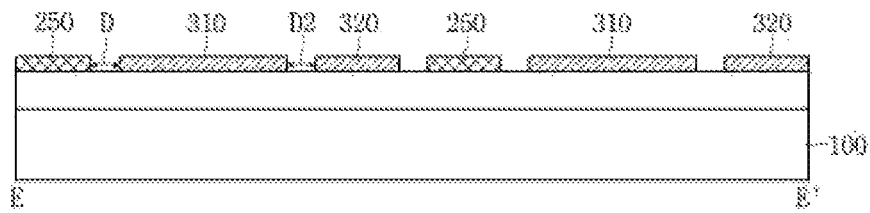
FIG. 12 is a sectional view taken along line E-E' of FIG. 11.

FIG. 11 is a perspective view of an active area AA of a touch window according to still another embodiment. FIG. 12 is a sectional view taken along line E-E' of FIG. 11. In the following description, same reference numerals may be assigned to elements or components performing same or similar functions as those of the previous embodiment. In addition, the following description may be made focusing on differences from the previous embodiment.

The touch window according to still another embodiment may sense the touch by the input device through a mutual capacitance scheme. In order to sense the touch through the mutual capacitance scheme, the reflective layer 200 may includes the sensing electrode 300, and the sensing electrode 300 may include a first sensing electrode 310 and a second sensing electrode 320. Multiple touches may be sensed and a position of the touch may be exactly sensed through a touch sensing by the first sensing electrode 310 and the second sensing electrode 320

In addition, the first sensing electrode 310 and the second sensing electrode 320 may be provided on the same surface of the cover substrate 100. The first and second sensing electrodes 310 and 320 may be separated from each other on one surface of the cover substrate 100. Capacitive coupling may be made between the first sensing electrode 310 and the second sensing electrode 320 arranged as described above to form mutual capacitance.

In order to increase a capacitive coupling amount by spreading adjacent surfaces of the first and second sensing electrodes 310 and 320, the first sensing electrode 310 may have a groove, the second sensing electrode 320 may have a protrusion, and the protrusion of the second sensing electrode 320 may be inserted into the groove of the first sensing electrode 310.

Shapes of the first sensing electrode 310 and the second sensing electrode 320 are not limited to those shown in drawings, but the first and second sensing electrodes 310 and 320 may have various shapes allowing the first and second sensing electrodes 310 and 320 to be formed on the same surface while being spaced apart from each other.

The sensing electrode 300 may be visible through the interval between the first sensing electrode 310 and the second sensing electrode 320. In order to prevent the sensing electrode 300 from being visible, the interval D2 between the first sensing electrode 310 and the second sensing electrode 320 may be in the range of 0.1 µm to 500 µm. The interval D2 between the first sensing electrode 310 and the second sensing electrode 320 may be in the range of 1 µm to 200 µm. For example, the interval D2 between the first and second sensing electrodes 310 and 320 may be 1 µm to 20 µm. When the interval D2 between the first sensing electrode 310 and the second sensing electrode 320 may be less than 0.1 µm, the first sensing electrode 310 and the second sensing electrode 320 may be shorted with each other, and a process of forming the interval D2 may be difficult. When the interval D2 between the first sensing electrode 310 and the second sensing electrode 320 exceeds 500 µm, the pattern of the sensing electrode 300 may be visible.

A dielectric substance may be filled in the space between the first sensing electrode 310 and the second sensing electrode 320. For example, air may be filled in the space between the first sensing electrode 310 and the second sensing electrode 320. In addition, the dielectric substance may include and adhesive layer (OCR or OCA).

In addition, an insulating blackening material may be filled in a portion or an entire portion of the space between the first sensing electrode 310 and the second sensing electrode 320. The insulating blackening material may absorb the light reflected from the reflective layer 200 to prevent the sensing electrode 300 from being visible and to prevent the reflective layer 200 from being oxidized.

The sensing electrode 300 may be connected with the wire electrode 400. The first sensing electrode 310 may be connected with a first wire electrode 410, and a second wire electrode 420 may be provided in the second sensing electrode 320. The wire electrode 400 may electrically connect the sensing electrode 300 with the print circuit board 500.

The reflective layer 200 may include the wire electrode 400. That is, a partial area of the reflective layer 200 may be separated from a remaining area of the reflective layer 200 by patterning the reflective layer 200, and the separated partial area may be used the wire electrode 400. For example, the wire electrode 400 may be formed by patterning the reflective layer 200 so that the wire electrode 400 may be connected with the pattern area constituting the sensing electrode 300 while extending the printed circuit board 500.

In addition, the insulating layer may be provided on the reflective layer 200, and an additional wire electrode 400 may be provided on the insulating layer.

Figure 13:
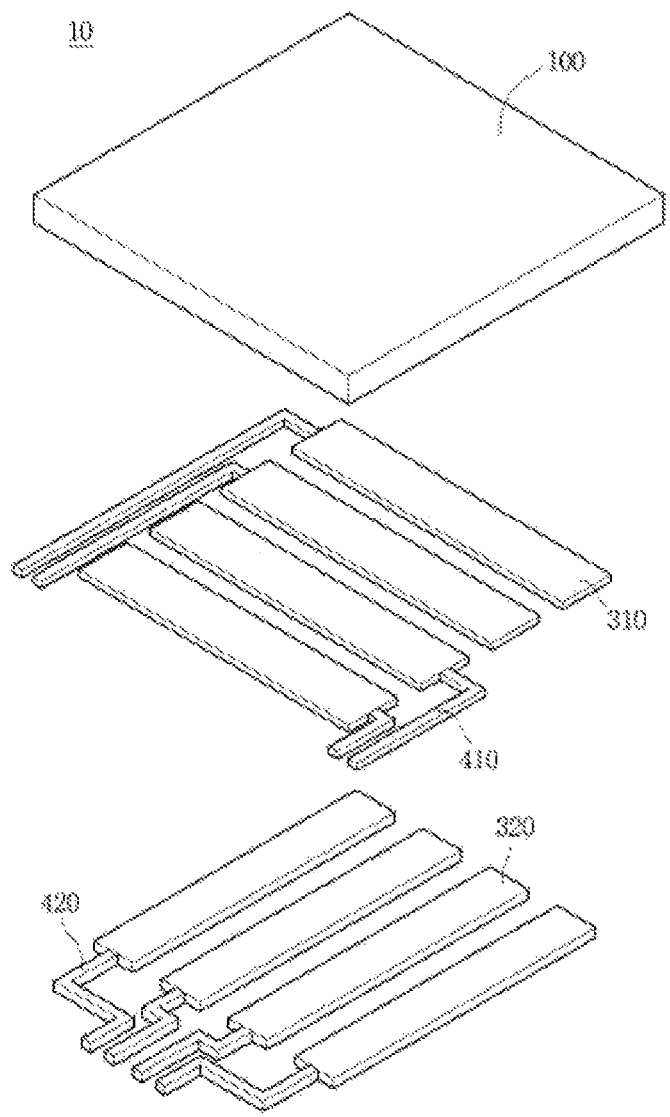
FIG. 13 is a perspective view of an active area of a touch window according to still another embodiment.
Figure 14:
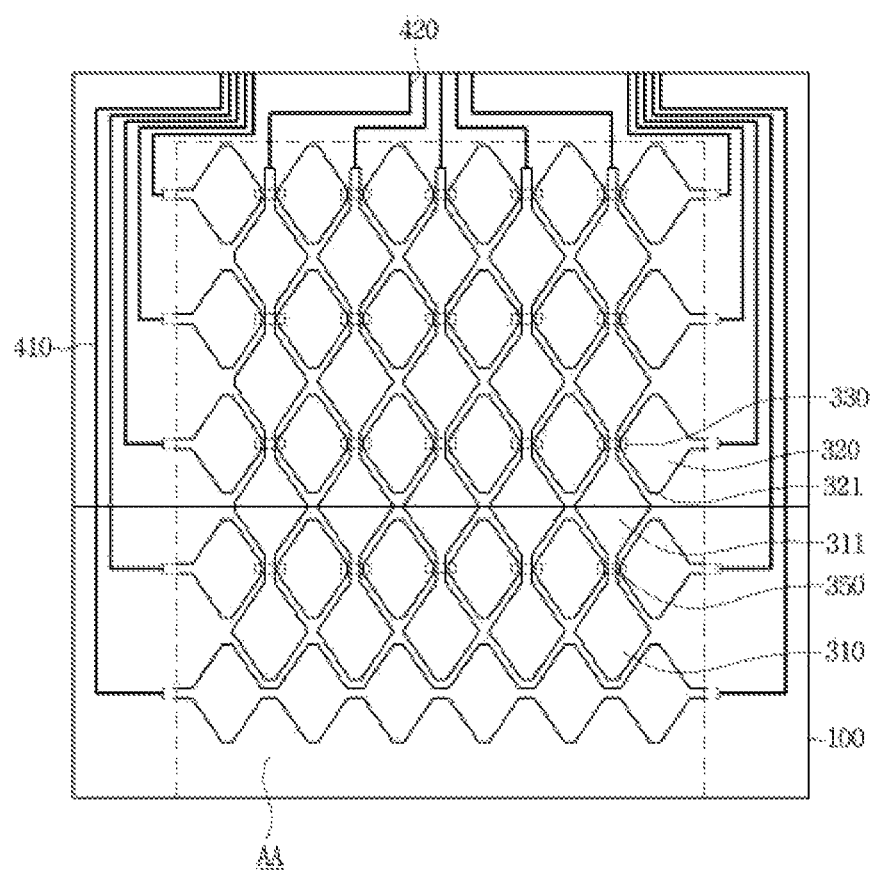
FIG. 14 is a plan view of FIG. 13.

FIG. 13 is a perspective view of an active area of a touch window according to still another embodiment. FIG. 14 is a plan view of FIG. 13. In the following description, same reference numerals may be assigned to elements or components performing same or similar functions as those of the previous embodiment. In addition, the following description may be made focusing on differences from the previous embodiment.

Referring to FIGS. 13 and 14, the touch window according to still another embodiment may include a cover substrate 100 and a reflective layer 200, the reflective layer 200 may include a sensing electrode 300, and the sensing electrode 300 includes a first sensing electrode 310 and a second sensing electrode 320.

In addition, the first sensing electrode 310 and the second sensing electrode 320 may be provided on the same surface of the cover substrate 100. The first sensing electrode 310 and the second sensing electrode 320 may be spaced apart from each other on one surface of the cover substrate 100.

The first sensing electrode 310 may extend in a first direction in the active area AA of the cover substrate 100. The first sensing electrode 310 may directly make contact with the cover substrate 100. The second sensing electrode 320 may extend in a second direction on the active area AA of the cover substrate 100. The second sensing electrode 320 may extend in the second direction different from the first direction, and may directly make contact with the cover substrate 100. The first and second sensing electrodes 310 and 320 may directly make contact with each other on the same surface of the cover substrate 100 while extending in mutually different directions on the same surface of the cover substrate 100. The first and second sensing electrodes 310 and 320 may be insulated from each other on the cover substrate 100.

A bridge electrode 330 may be provided on a surface of the cover substrate 100 provided therein with the sensing electrode 300. The bridge electrode 330 may be arranged in a bar shape. Bridge electrodes 330 may be spaced apart from each other by a predetermined interval on the active area AA, and may be arranged in the bar shape.

An insulating material 350 may be provided on the bridge electrode 330. The insulating material 350 may be partially provided on the bridge electrode 330, and a portion of the bridge electrode 330 may be covered with the insulating material 350. For example, when the bridge electrode 330 is formed in the bar shape, the insulating material 350 may be provided on a remaining area of the bridge electrode 330 except for one end and an opposite end of the bridge electrode 330, that is, both ends of the bridge electrode 330.

First sensing electrodes 310 may be connected with each other on the insulating material 350. For example, the first sensing electrodes 310 extending in the first direction may be connected with each other on the insulating material 350.

In addition, the second sensing electrode 320 may be connected with the bridge electrode 330. Second sensing electrodes 320 spaced apart from each other may be connected with the bridge electrode 330 while extending in the second direction.

Accordingly, the first sensing electrode 310 and the second sensing electrode 320 may be prevented from being shorted with respect to the bridge electrode 330 due to the insulating material so that the first and second sensing electrodes 310 and 320 may be electrically connected with the bridge electrode 330.

Figure 15:
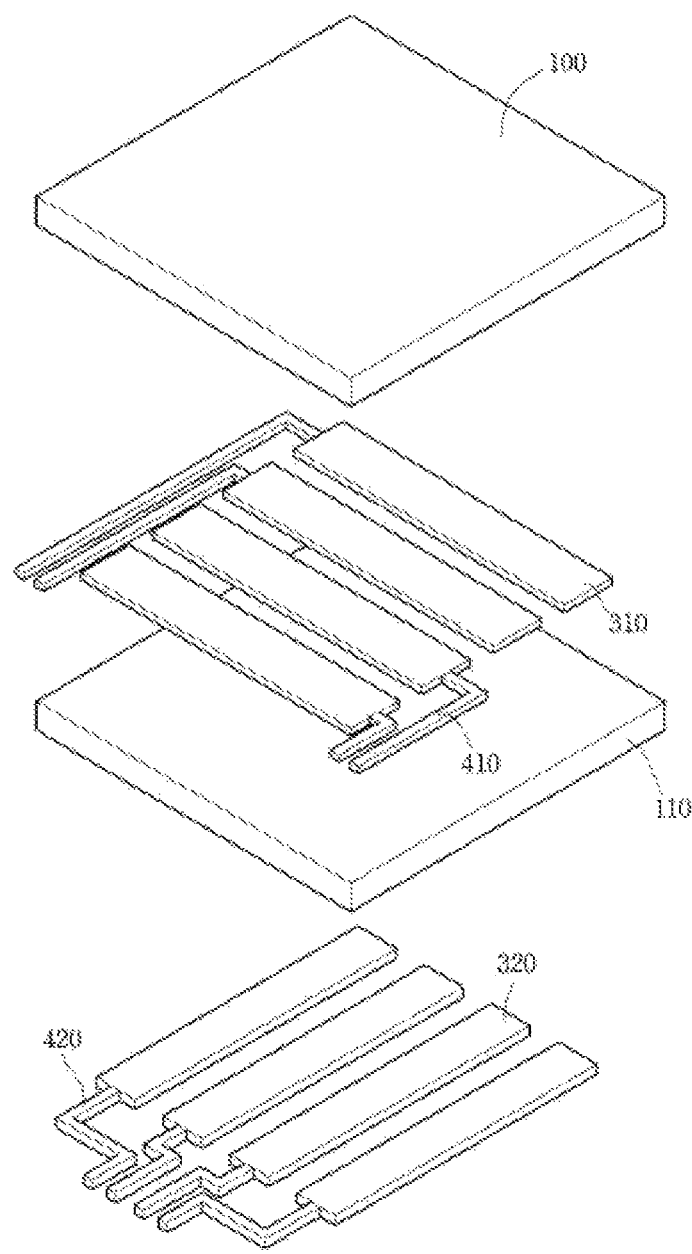
FIG. 15 is a perspective view of an active area of a touch window according to still another embodiment.

FIG. 15 is a perspective view of an active area AA of a touch window according to still another embodiment. In the following description, same reference numerals may be assigned to elements or components performing same or similar functions as those of the previous embodiment. In addition, the following description may be made focusing on differences from the previous embodiment.

The touch window according to still another embodiment may include a cover substrate 100, a reflective layer 200, and a substrate 110. The reflective layer 200 may include a first sensing electrode 310, and the substrate 110 may include a second sensing electrode 320. The substrate 110 may be provided on the cover substrate 100. The substrate 100 may be rigid or flexible. For example, the substrate 110 may include glass or plastic. In detail, the substrate 110 may include plastic such as polyethylene terephthalate (PET) or polyimide (PI), or sapphire.

In addition, the substrate 110 may be bent with a partial curved surface. That is, the substrate 110 may be bent with a partial flat surface and a partial curved surface. An end of the substrate 110 may be bent with a curved surface or may be bent or flexed with a surface including a random curvature.

The cover substrate 100 may be bonded to the substrate 110 through an adhesive layer. For example, the cover substrate 100 and the substrate 110 may be bonded to each other through an optical clear adhesive (OCA).

The sensing electrode 300 may be provided on the cover substrate 100 and the substrate 110. For example, the first sensing electrode 310 may be provided on the cover substrate 100, and the second sensing electrode 320 may be provided on the substrate 110. That is, the reflective layer 200 on the cover substrate 100 may include the first sensing electrode 310. An additional second sensing electrode 320 may be provided on the substrate 110.

In addition, the wire electrode 400 may include a first wire electrode 410 connected with the first sensing electrode 310 and a second wire electrode 420 connected with the second sensing electrode 320. The first wire electrode 410 may be provided on the cover substrate 100, and the second wire electrode 420 may be provided on the substrate 110. That is, the reflective layer 200 on the cover substrate 100 may include the first wire electrode 410. The additional second wire electrode 420 may be provided on the substrate 110.

Figure 16:
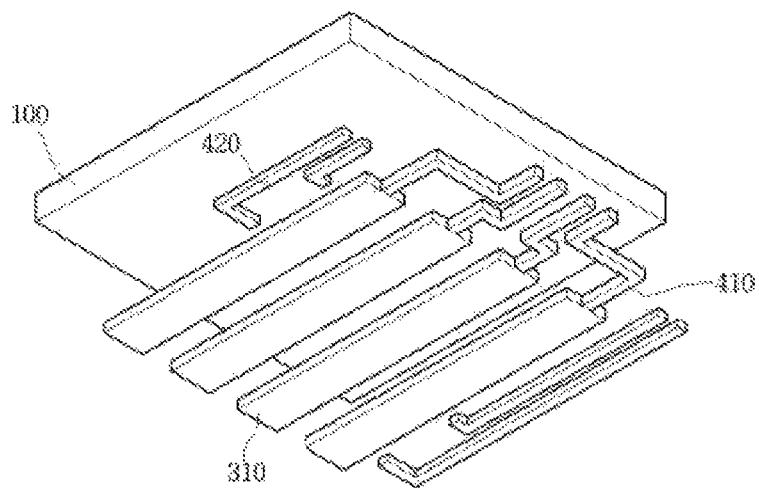
FIG. 16 is a perspective view of an active area of a touch window according to still another embodiment.
Figure 16:
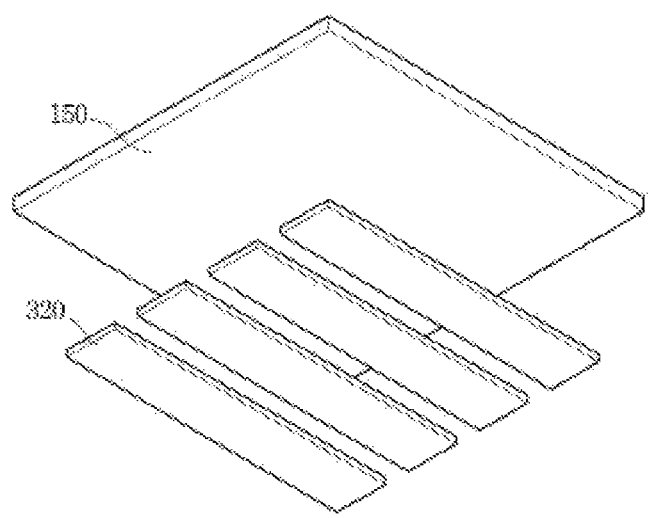

FIG. 16 is a perspective view of an active area AA of a touch window according to still another embodiment. In the following description, same reference numerals may be assigned to elements or components performing same or similar functions as those of the previous embodiment. In addition, the following description may be made focusing on differences from the previous embodiment.

The touch window according to still another embodiment may include a cover substrate 100, a reflective layer 200, and an intermediate layer 150. The reflective layer 200 may include a first sensing electrode 310. In addition, a second sensing electrode 320 may be provided on the intermediate layer 150.

The intermediate layer 150 may include a material different from that of the cover substrate 100. For example, the intermediate layer may include a dielectric material. The insulating layer 150 may include an insulating group including halogen compound of alkali metal or alkali earth metal, such as LiF, KCl, $CaF_2$, or $MgF_2$, or fused silica, such as $SiO_2$, SiNX, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as ZnOx, ZnS, ZnSe, TiOx, WOx, MoOx, or ReOx; an organic semiconductor group including $Alq_3$, NPB, TAPC, 2TNATA, CBP or Bphen; and a low-K material such as silsesquioxane or a derivative $((H-SiO_{3/2})n)$ thereof, methylsilsesquioxane $(CH3-SiO_{3/2})n)$, porous silica or porous silica doped with fluorine or carbon atoms, porous zinc oxide (ZnOx), cyclized-perfluoropolymer (CYTOP) or a mixture thereof.

In addition, the insulating layer 150 may have visible ray transmittance of about 75% to 99%.

In this case, a thickness of the insulating layer 150 may be less than those of the cover substrate 100. In detail, the thickness of the insulating layer 150 may be about 0.01 to about 0.1 times those of the cover substrate 100. For example, thicknesses of the cover substrate 100 may be equal to about 0.1 mm and the thickness of the insulating layer 150 may be equal to about 0.001 mm.

In addition, a sectional area of the intermediate layer 150 may be different from that of the cover substrate 100. The sectional area of the intermediate layer 150 may be smaller than that of the cover substrate 100. Accordingly, the intermediate layer 150 may be smaller than the reflective layer 200.

The intermediate layer 150 may be directly provided on the top surface of the reflective layer 200. That is, the intermediate layer 150 may be formed by directly applying a dielectric material onto a top surface of the reflective layer 200. Thereafter, the second sensing electrode may be provided on the intermediate layer 150.

Figure 17:
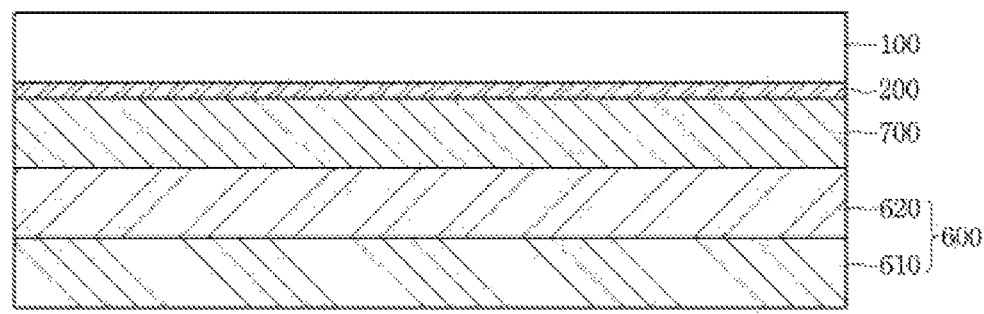
FIG. 17 is a sectional view of a combination of a touch window and a display panel according to an embodiment.

Embodiments of a touch device, in which the above-described touch window and a display panel may be coupled to each other, will be described with reference to FIGS. 15 to 17. A touch device, in which the above-described touch window and a display panel may be coupled to each other, will be described with reference to FIGS. 17 to 20.

Referring to FIG. 15, the touch device according to an embodiment may include the touch window provided on a display panel 700. The touch device may be formed by coupling the touch window to a display panel 600. The touch window may be bonded to the display panel 600 through an adhesive layer 700. For example, the touch window may be combined with the display panel 600 through the adhesive layer 700 including an optical clear adhesive (OCA) or optical clear resin (OCR). The reflective layer 200 of the touch window and the display panel may be combined with each other through the adhesive layer 700

The display panel 600 may include a first substrate 610 and a second substrate 620. When the display panel 600 is a liquid crystal display panel, the display panel 600 may have a structure in which the first substrate 610 including a thin film transistor (TFT) and a pixel electrode may be combined with the second substrate 620 including color filter layers while a liquid crystal layer is interposed or provided between the first and second substrates 610 and 620.

Further, the display panel 600 may be a liquid crystal display panel having a color filter on transistor (COT) structure formed by combining the first substrate 610 formed thereon with the TFT, a color filter, and a black matrix with the second substrate 620 while the liquid crystal layer is interposed or provided between the first and second substrates 610 and 620. That is, the TFT may be formed on the first substrate 610, a protective layer may be formed on the TFT, and the color filter layer may be formed on the protective layer. In addition, the pixel electrode, which may make contact with the TFT, may be formed on the first substrate 610. In this case, to improve an aperture ratio and simplify a mask process, a black matrix may be omitted, and a common electrode may perform a function of the black matrix together with the inherent function thereof. In addition, when the display panel 600 is a liquid crystal panel, the display device may further include a backlight unit for providing light at the back of the display panel 600.

When the display panel 600 is an organic light emitting display panel, the display panel 600 may include a self-light emitting device that may not require any additional light source. A thin film transistor may be formed on the first substrate 610 of the display panel 600, and an organic light-emitting device (OLED) making contact with the thin film transistor may be formed. The OLED may include an anode, a cathode and an organic light-emitting layer formed between the anode and the cathode. In addition, the display panel 600 may further include the second substrate 620, which may perform a function of an encapsulation substrate for encapsulation, on the OLED.

The screen image output from the display panel may pass through the reflective layer 200.

Figure 18:
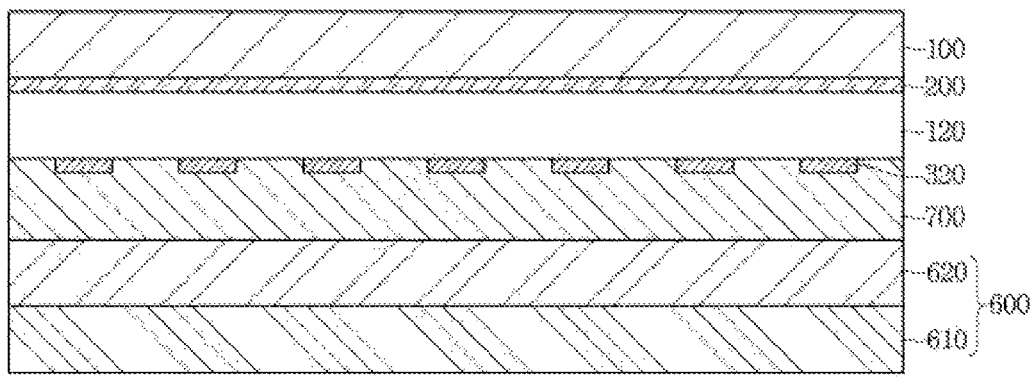
FIG. 18 is a sectional view of a combination of a touch window and a display panel according to another embodiment.

Referring to FIG. 18, when a substrate is further provided on the cover substrate 100, the touch device may be formed by combining the substrate with the display panel 600. The substrate may be bonded to the display panel 600 through the adhesive layer 700. For example, the substrate may be combined with the display panel 600 through the adhesive layer 700 including the OCA or the OCR.

Figure 19:
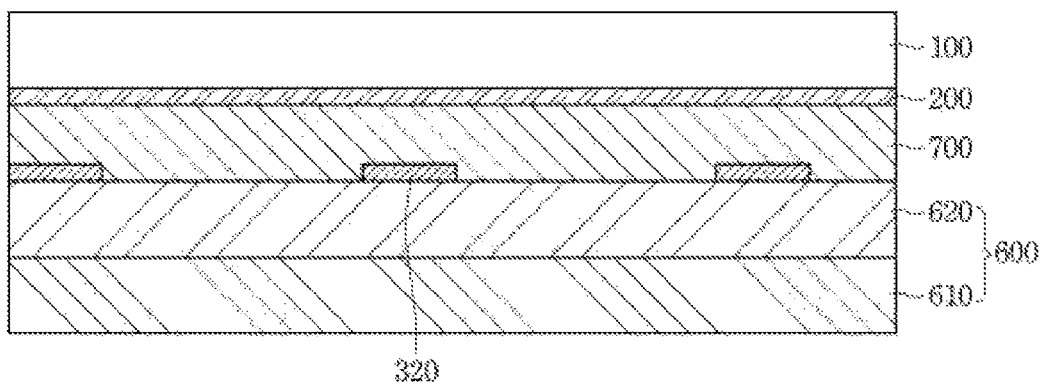
FIG. 19 is a sectional view of a combination of a touch window and a display panel according to still another embodiment.

Referring to FIG. 19, the touch device according to the embodiment may include a touch window formed integrally with the display panel 600. That is, at least one sensing electrode 300 may be provided on the display panel. For example, at least one sensing electrode 300 may be provided on at least one surface of the display panel 600. That is, at least one sensing electrode may be formed on at least one surface of the first substrate 610 and the second substrate 620. In this case, the reflective layer 200 provided on the top surface of an upper cover substrate 100 may include at least one sensing electrode 300.

Referring to FIG. 19, the first sensing electrode 310 formed by patterning the reflective layer 200 may be provided on one surface of the cover substrate 100. In addition, the second sensing electrode 320 may be provided on one surface of the display panel 600.

The adhesive layer 700 may be interposed or provided between the cover substrate 100 and the display panel 600, so that the cover substrate 100 may be combined with the display panel 600.

In addition, a polarizing plate may be provided under the cover substrate 100. The polarizing plate may be a linear polarizing plate or an anti-reflection polarizing plate. For example, when the display panel 600 is a liquid crystal display panel, the polarizing plate may be a linear polarizing plate. When the display panel 600 is an organic electroluminescence display panel, the polarizing plate may be an anti-reflection polarizing plate.

The screen image output from the display panel may pass through the reflective layer 200. In addition, at least one sensing electrode 300 may be provided on one surface of the polarizing plate.

At least one substrate to support the sensing electrode 300 may be omitted in the touch device according to the embodiment. Accordingly, a thin and light touch device may be formed.

Figure 20:
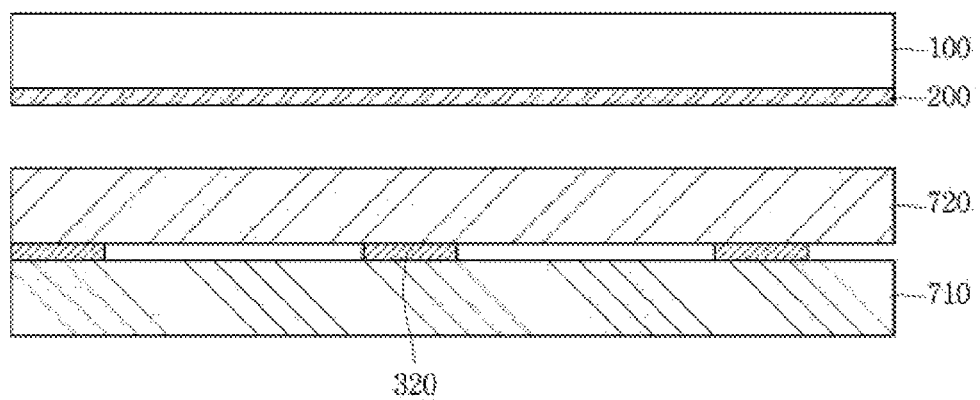
FIG. 20 is a sectional view of a combination of a touch window and a display panel according to still another embodiment.

Referring to FIG. 20, the touch device according to the embodiment may include a touch window formed integrally with the display panel 600. For example, at least one sensing electrode 300 may be formed inside the display panel. The display panel may include the first substrate 610 and the second substrate 620. The first sensing electrode 310 or the second sensing electrode 320 may be interposed or provided between the first substrate 610 and the second substrate 620. That is, at least one sensing electrode 300 may be provided on at least one surface of the first substrate 610 or the second substrate 620.

A polarizing plate may be additionally provided under the cover substrate 100. At least one sensing electrode 300 may be provided on one surface of the polarizing plate.

When the display panel is a liquid crystal display panel, and when the second sensing electrode 320 is formed on the top surface of the first substrate 610, the second sensing electrode 320 may be formed together with a TFT or a pixel electrode. When the second sensing electrode 320 is formed on the rear surface of the second substrate 620, a color filter layer may be formed on the second sensing electrode or the second sensing electrode 320 may be formed on the color filter layer. When the display panel 600 is an organic electroluminescence display panel, and when the second sensing electrode 320 is formed on the top surface of the first substrate 610, the second sensing electrode 320 may be formed together with the TFT or the organic light emitting device.

A substrate to support the sensing electrode 300 may be omitted in the touch device according to the embodiment. Accordingly, a thin and light touch device may be formed. In addition, the sensing electrode 300 and the wire may be formed together with elements formed on the display panel, thereby simplifying a manufacturing process and reducing cost.

Figure 21:
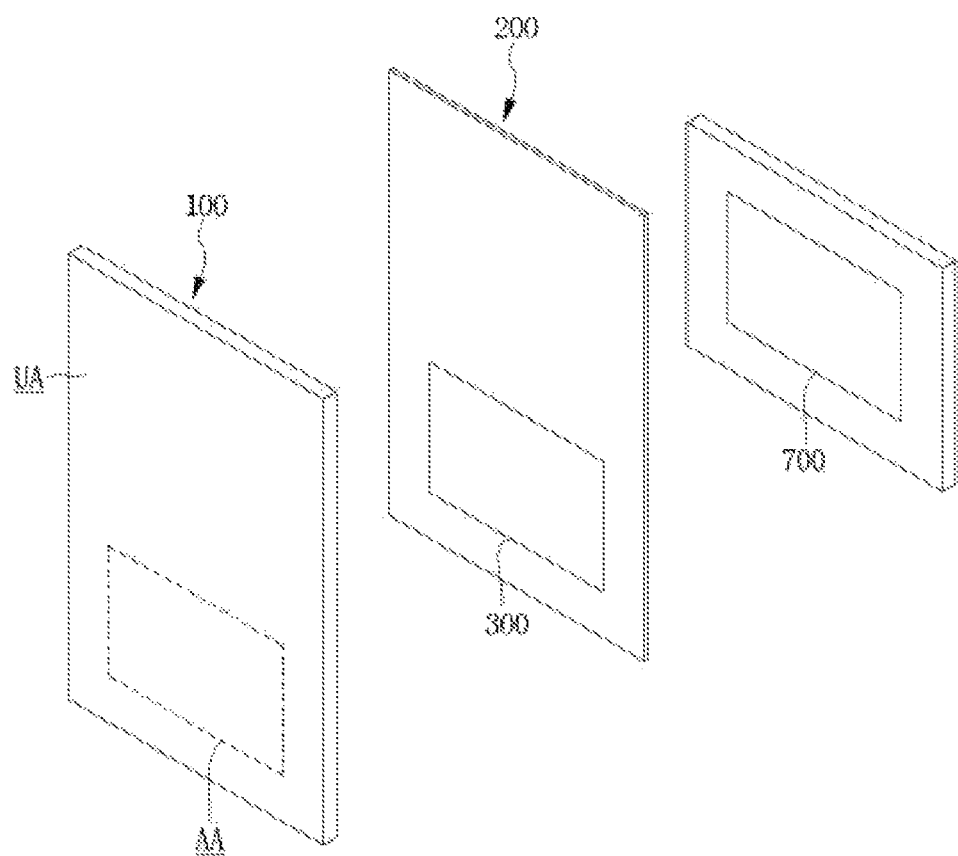
FIG. 21 is a view of a touch device employing the touch window according to embodiments.

FIG. 21 is a view of a touch device according to embodiments. Referring to FIG. 21, the touch device may include a cover substrate 100, a reflective layer 200 including a sensing electrode 300, and a display panel. The cover substrate 100 may have the active area AA and the unactive area UA defined therein. The sensing electrode 300 may be formed through patterning in the reflective layer 200 overlapped with the active area AA. The display panel may be provided on one surface of the reflective layer 200 overlapped with the active area AA.

The touch device may serve as a mirror for a user, and may provide a display through the active area AA. In addition, the user may touch an image on the display, so that the user can experience a new user interface.

Embodiments disclosed herein provide a touch window that may serve as a mirror and may sense a touch.

According to an embodiment disclosed herein, a touch window may include a cover substrate, a reflective layer provided on the cover substrate and including a sensing electrode, a wire electrode connected with the sensing electrode, and a printed circuit board electrically connected with the sensing electrode through the wire electrode.

As described above, the touch window according to the embodiment may include a reflective layer. The reflective layer may reflect light incident thereto from one side similar to a mirror, and transmit light incident thereto from an opposite side to the one side. Accordingly, the touch window may serve as the mirror and sense a touch.

Since the reflective layer has a conductive characteristic, the sensing electrode may be formed by patterning the reflective layer. Accordingly, a touch from the input device may be sensed by using the reflective layer as the sensing electrode without an additional touch panel.

The touch window according to the embodiment may sense the touch from the input device by using the patterning area, which may be included in the reflective layer, as the sensing electrode without the additional touch panel. Accordingly, process costs may be saved.

It will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

When a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
   a cover substrate;
   a reflective layer provided on the cover substrate and including a sensing electrode;
   a wire electrode connected with the sensing electrode; and
   a printed circuit board electrically connected with the sensing electrode through the wire electrode,
   wherein the sensing electrode is provided on a partial area of the reflective layer that is formed to be patterned,
   wherein the reflective layer includes the sensing electrode formed by patterning the reflective layer and a remaining pattern adjacent to the sensing electrode,
   wherein an interval between the remaining pattern and the sensing electrode is in a range of 0.1 µm to 500 µm.

2. The touch window of claim 1, wherein the reflective layer reflects light incident onto an opposite side to one surface of the cover substrate on which the reflective layer is provided.

3. The touch window of claim 1, wherein the reflective layer includes a thin film including at least one selected from the group consisting of consisting chromium (Cr), nickel (Ni), copper (Cu), aluminum (Al), silver (Ag), molybdenum (Mo), gold (Au), titanium (Ti), and an alloy thereof.

4. The touch window of claim 1, wherein the sensing electrode and the remaining pattern are arranged with a space therebetween, and a dielectric substance is provided in the space.

5. The touch window of claim 4, wherein the dielectric substance includes at least one of an adhesive layer, air, and a blackening material.

6. The touch window of claim 1, wherein the sensing electrode and the remaining pattern have equal heights.

7. The touch window of claim 1, wherein the sensing electrode includes a plurality of electrode patterns arranged in a matrix shape.

8. The touch window of claim 1, wherein the reflective layer further includes the wire electrode.

9. The touch window of claim 1, wherein the reflective layer is formed on an entire surface of the substrate.

10. The touch window of claim 9, wherein the sensing electrode includes a first sensing electrode and a second sensing electrode spaced apart from the first sensing electrode.

11. The touch window of claim 1, wherein the reflective layer transmits light incident onto an opposite side to one surface of the cover substrate.

12. The touch window of claim 1, wherein a partial area of the cover substrate is defined as an active area, and a remaining area of the cover substrate except for the active area is defined as an unactive area.

13. The touch window of claim 12, wherein the sensing electrode is provided in the active area of the cover substrate.

14. The touch window of claim 12, further comprising a display panel under the active area of the cover substrate, such that an image is displayed on the active area.

15. A touch device comprising the touch window of claim 1 and a display panel on a rear surface of the touch window.

16. A touch window comprising:
   a cover substrate having an active area and an unactive area defined therein;
   a reflective layer on the unactive area of the cover substrate;
   a sensing electrode having a reflective characteristic and provided on the active area; and
   a wire electrode connected with the sensing electrode,
   wherein the reflective layer and the sensing electrode have equal heights from the cover substrate,
   wherein the reflective layer includes the sensing electrode formed by patterning the reflective layer and a remaining pattern adjacent to the sensing electrode,
   wherein an interval between the remaining pattern and the sensing electrode is in a range of 0.1 µm to 500 µm.

17. The touch window of claim 16, wherein the reflective layer and the sensing electrode include an identical material.

18. The touch window of claim 16, wherein a space is formed between the reflective layer and the sensing electrode, and a dielectric substance is provided in the space.

* * * * *